(No Model.)
W. H. ISBELL.
CALIPER JOINT.
No. 483,065. Patented Sept. 20, 1892.
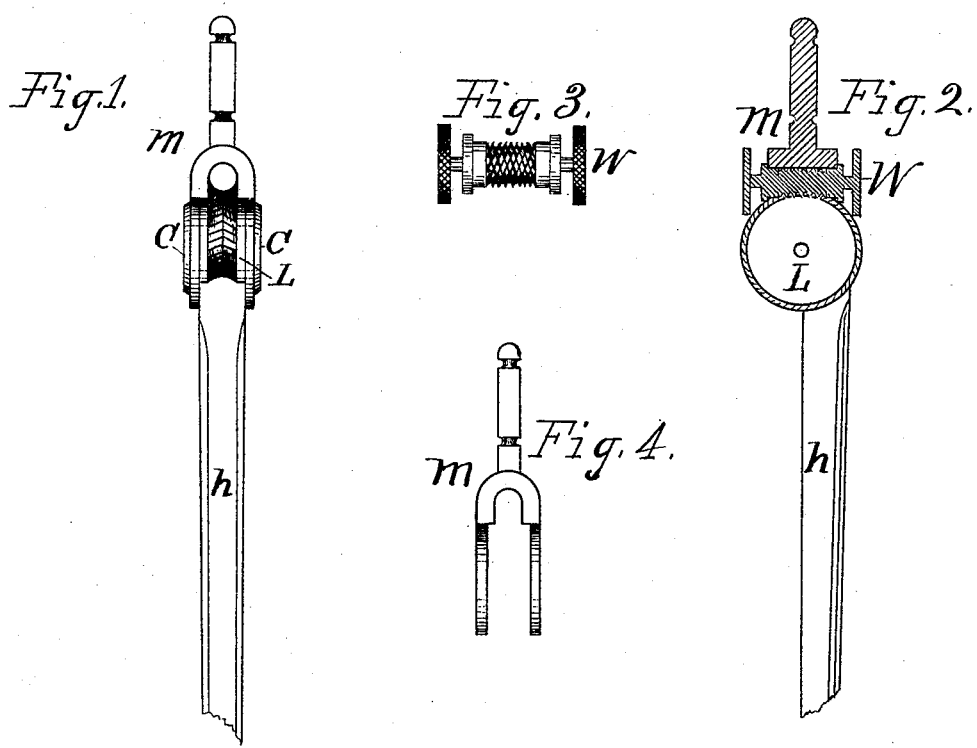
WITNESSES:
William E. Garrett
George T. Isbell
INVENTOR
Willard H. Isbell.
BY
Willard H. Isbell.
ATTORNEY.

UNITED STATES PATENT OFFICE.

WILLARD H. ISBELL, OF NEW YORK, N. Y.

CALIPER-JOINT.

SPECIFICATION forming part of Letters Patent No. 483,065, dated September 20, 1892.

Application filed December 30, 1891. Serial No. 416,611. (No model.)

*To all whom it may concern:*

Be it known that I, WILLARD H. ISBELL, a citizen of the United States, residing at Woodlawn, in the city of New York, county and State of New York, have invented a new and useful Improvement in Drawing and Measuring Instruments, of which the following is a specification.

My invention relates to an improved device for adjusting drawing and measuring instruments—such as dividers, calipers, &c.—in which a screw having a right-hand and a left-hand thread, one crossing the other, worms or gears into similar threads or teeth formed on the outer circumference of the joints of said instruments.

The objects of my invention are to provide a means of accurately and quickly adjusting such instruments to exact measurements and holding them firmly to the adjustment. I attain the objects by the device illustrated in the accompanying drawings, in which—

Figure 1 is a side view of a pair of dividers with the screw W removed to show the bearing in which it rests and the shape of the edge of the joints, with the teeth or threads in which the screw operates. Fig. 2 shows one leg of a pair of dividers and the circle of the joint by which the legs are fastened together, and also a section of the screw W and of the upper part of the form M. Fig. 3 shows the screw which operates the joints. Fig. 4 shows the form M.

The respective letters refer to similar parts in the different views.

Fig. 1 represents a pair of dividers having a circular joint L. The two sections as joined together have on the inner edge of their circumference, at the point of contact with each other, a series of teeth or threads—on one joint a right-hand thread and on the other a left-hand thread—corresponding with the threads of the screw W. The joints L when in place rest between the leaves of the form M, which are of similar size and shape to L. A screw or rivet passes through one of the washers C, through the center of the joints L and the form M, and screws into the other washer C in the usual manner, holding all in position and forming the pivot on which the joints turn.

W is a screw having a right-hand and a left-hand thread cut one across the other and corresponding with the threads on the circumference of the joints L, in which it rests when in position. A short plain surface extending beyond the threads offers a bearing-surface for the screw, and the raised shoulders hold it in position. At either end of the screw is a button or thumb-piece for turning the screw. The screw may be made in one piece, as shown in the drawings, or it may be made with one end removable and held in place by a small nut, thus being adjustable for wear, and instead of a square shoulder it may be made with a tapering shoulder, which on turning up the nut for adjustment will force the screw firmly against the threads of the joints, compensating for wear in this direction.

The size of the parts may be varied according to the use the instrument is intended for, the larger joints operating more slowly, but holding more firmly, for nice adjustments.

The device may be applied to instruments having joints as ordinarily made by fitting to the outside of the joints rings or disks with teeth formed on them, instead of on the joints themselves; or when the instruments are made of brass the threads may be made on rings of harder metal to withstand the wear and attached to the joints as described.

What I claim as my invention, and desire to secure by Letters Patent, is—

1. In drawing and measuring instruments, the combination of a screw having a right-hand and a left-hand thread formed the one crossing the other over the same surface and corresponding with similar threads or teeth formed on the joints of the instruments and in which the said screw rests, as herein specified.

2. The combination, in drawing and measuring instruments, of a screw having a right-hand and a left-hand thread formed one over the other and meshing or worming into similar threads formed on the circumference of the joints of said instruments, as described.

3. In drawing and measuring instruments, the combination of a screw having both a right-hand and a left-hand thread, one crossing the other, having its bearing in form M and being held in position by the same against the right-hand and left-hand worm-gear formed, respectively, on the separate joints of said instruments or on rings of suitable metal attached thereto, all substantially as described.

WILLARD H. ISBELL.

Witnesses:
 WILLIAM E. GARRETT,
 GEORGE T. ISBELL.